United States Patent [19]
Moore et al.

[11] Patent Number: 6,009,694
[45] Date of Patent: Jan. 4, 2000

[54] GRASS TRIMMER WHEELED CARRIAGE ASSEMBLY

[76] Inventors: Larry Moore, Rte. 1 Box 6400, Porum, Okla. 74455; Becky Davis, Rte. 3 Box 1585, Checotah, Okla. 74426-9507

[21] Appl. No.: 09/220,945

[22] Filed: Dec. 24, 1998

[51] Int. Cl.[7] .............................. A01D 34/00; B62C 1/00; B62B 1/00
[52] U.S. Cl. ....................... 56/12.7; 56/16.7; 56/DIG. 9; 280/47.17; 280/47.33; 280/63; 280/652
[58] Field of Search .............................. 280/47.17, 47.33, 280/63, 652, DIG. 6; 56/2, 1, 12.1, 12.7, 16.7, DIG. 9, 229

[56] References Cited

U.S. PATENT DOCUMENTS

| | | | |
|---|---|---|---|
| 556,616 | 3/1896 | Carmichael | 280/63 |
| 597,337 | 1/1898 | Stouffer | 280/63 |
| 4,182,100 | 1/1980 | Letter | 56/16.7 |
| 4,224,784 | 9/1980 | Hansen et al. | 56/16.9 |
| 5,301,757 | 4/1994 | Kelley, Jr. | 172/15 |
| 5,317,807 | 6/1994 | Pulley | 30/296.1 |
| 5,351,762 | 10/1994 | Bean | 172/17 |
| 5,408,816 | 4/1995 | Cartier | 56/17.5 |
| 5,626,006 | 5/1997 | Fricke, Sr. | 56/12.7 |
| 5,829,236 | 11/1998 | Ballard et al. | 56/16.7 |

*Primary Examiner*—Thomas B. Will
*Assistant Examiner*—Gary S. Hartmann

[57] ABSTRACT

A wheeled carriage assembly for supporting a grass trimmer. The wheeled carriage assembly includes a pair of frames each having elongate front, top, and bottom portions. The top and bottom portions of each frame are spaced apart from one another with the front portion of each frame connecting associated top and bottom portions of the respective frame. The front portions of the frames are coupled together. The frames each have an elongate rear fork extending between the associated top and bottom portions of the respective frame. A ground engaging rear wheel is positioned between the bottom portions of the frame and is rotatably mounted to the rear forks of the frames. A generally J-shaped front fork is coupled to the frames between the front portions of the frames. A pair of adjacent ground engaging front wheels are pivotally mounted to the front fork. The frames each has a handle portion adjacent the associated top portion of the respective frame. A pair of generally rectangular U-shaped mounting brackets are coupled to the top portions of the frames.

9 Claims, 2 Drawing Sheets

GRASS TRIMMER WHEELED CARRIAGE ASSEMBLY

BACKGROUND OF THE INVENTION

1. Field of the Invention

The present invention relates to wheeled carriage assemblies for supporting grass trimmers and more particularly pertains to a new wheeled carriage assembly for supporting a grass trimmer.

2. Description of the Prior Art

The use of wheeled carriage assemblies for supporting grass trimmers is known in the prior art. More specifically, wheeled carriage assemblies for supporting grass trimmers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,531,350 by Huthmacher; U.S. Pat. No. 4,704,849 by Gilbert et al.; U.S. Pat. No. 4,922,694 by Emoto; U.S. Pat. No. 4,182,100 by Letter; U.S. Pat. No. 2,203,198 by Junge; and U.S. Pat. No. Des. 350,463 by Hardesty, Jr.

While these devices fulfill their respective, particular objectives and requirements, the aforementioned patents do not disclose a new wheeled carriage assembly. The inventive device includes a pair of frames each having elongate front, top, and bottom portions. The top and bottom portions of each frame are spaced apart from one another with the front portion of each frame connecting associated top and bottom portions of the respective frame. The front portions of the frames are coupled together. The frames each have an elongate rear fork extending between the associated top and bottom portions of the respective frame. A ground engaging rear wheel is positioned between the bottom portions of the frame and is rotatably mounted to the rear forks of the frames. A generally J-shaped front fork is coupled to the frames between the front portions of the frames. A pair of adjacent ground engaging front wheels are pivotally mounted to the front fork. The frames each has a handle portion adjacent the associated top portion of the respective frame. A pair of generally rectangular U-shaped mounting brackets are coupled to the top portions of the frames.

In these respects, the wheeled carriage assembly according to the present invention substantially departs from the conventional concepts and designs of the prior art, and in so doing provides an apparatus primarily developed for the purpose of supporting a grass trimmer.

SUMMARY OF THE INVENTION

In view of the foregoing disadvantages inherent in the known types of wheeled carriage assemblies for supporting grass trimmers now present in the prior art, the present invention provides a new wheeled carriage assembly construction wherein the same can be utilized for supporting a grass trimmer.

The general purpose of the present invention, which will be described subsequently in greater detail, is to provide a new wheeled carriage assembly apparatus and method which has many of the advantages of the wheeled carriage assemblies for supporting grass trimmers mentioned heretofore and many novel features that result in a new wheeled carriage assembly which is not anticipated, rendered obvious, suggested, or even implied by any of the prior art wheeled carriage assemblies for supporting grass trimmers, either alone or in any combination thereof.

To attain this, the present invention generally comprises a pair of frames each having elongate front, top, and bottom portions. The top and bottom portions of each frame are spaced apart from one another with the front portion of each frame connecting associated top and bottom portions of the respective frame. The front portions of the frames are coupled together. The frames each have an elongate rear fork extending between the associated top and bottom portions of the respective frame. A ground engaging rear wheel is positioned between the bottom portions of the frame and is rotatably mounted to the rear forks of the frames. A generally J-shaped front fork is coupled to the frames between the front portions of the frames. A pair of adjacent ground engaging front wheels are pivotally mounted to the front fork. The frames each has a handle portion adjacent the associated top portion of the respective frame. A pair of generally rectangular U-shaped mounting brackets are coupled to the top portions of the frames.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wheeled carriage assembly apparatus and method which has many of the advantages of the wheeled carriage assemblies for supporting grass trimmers mentioned heretofore and many novel features that result in a new wheeled carriage assembly which is not anticipated, rendered obvious, suggested, or even implied by any of the prior art wheeled carriage assemblies for supporting grass trimmers, either alone or in any combination thereof.

It is another object of the present invention to provide a new wheeled carriage assembly which may be easily and efficiently manufactured and marketed.

It is a further object of the present invention to provide a new wheeled carriage assembly which is of a durable and reliable construction.

An even further object of the present invention is to provide a new wheeled carriage assembly which is susceptible of a low cost of manufacture with regard to both materials and labor, and which accordingly is then susceptible of low prices of sale to the consuming public, thereby making such wheeled carriage assembly economically available to the buying public.

Still yet another object of the present invention is to provide a new wheeled carriage assembly which provides in the apparatuses and methods of the prior art some of the advantages thereof, while simultaneously overcoming some of the disadvantages normally associated therewith.

Still another object of the present invention is to provide a new wheeled carriage assembly for supporting a grass trimmer.

Yet another object of the present invention is to provide a new wheeled carriage assembly which includes a pair of frames each having elongate front, top, and bottom portions. The top and bottom portions of each frame are spaced apart from one another with the front portion of each frame connecting associated top and bottom portions of the respective frame. The front portions of the frames are coupled together. The frames each have an elongate rear fork extending between the associated top and bottom portions of the respective frame. A ground engaging rear wheel is positioned between the bottom portions of the frame and is rotatably mounted to the rear forks of the frames. A generally J-shaped front fork is coupled to the frames between the front portions of the frames. A pair of adjacent ground engaging front wheels are pivotally mounted to the front fork. The frames each has a handle portion adjacent the associated top portion of the respective frame. A pair of generally rectangular U-shaped mounting brackets are coupled to the top portions of the frames.

Still yet another object of the present invention is to provide a new wheeled carriage assembly that may also be used to support metal detectors and leaf blowers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
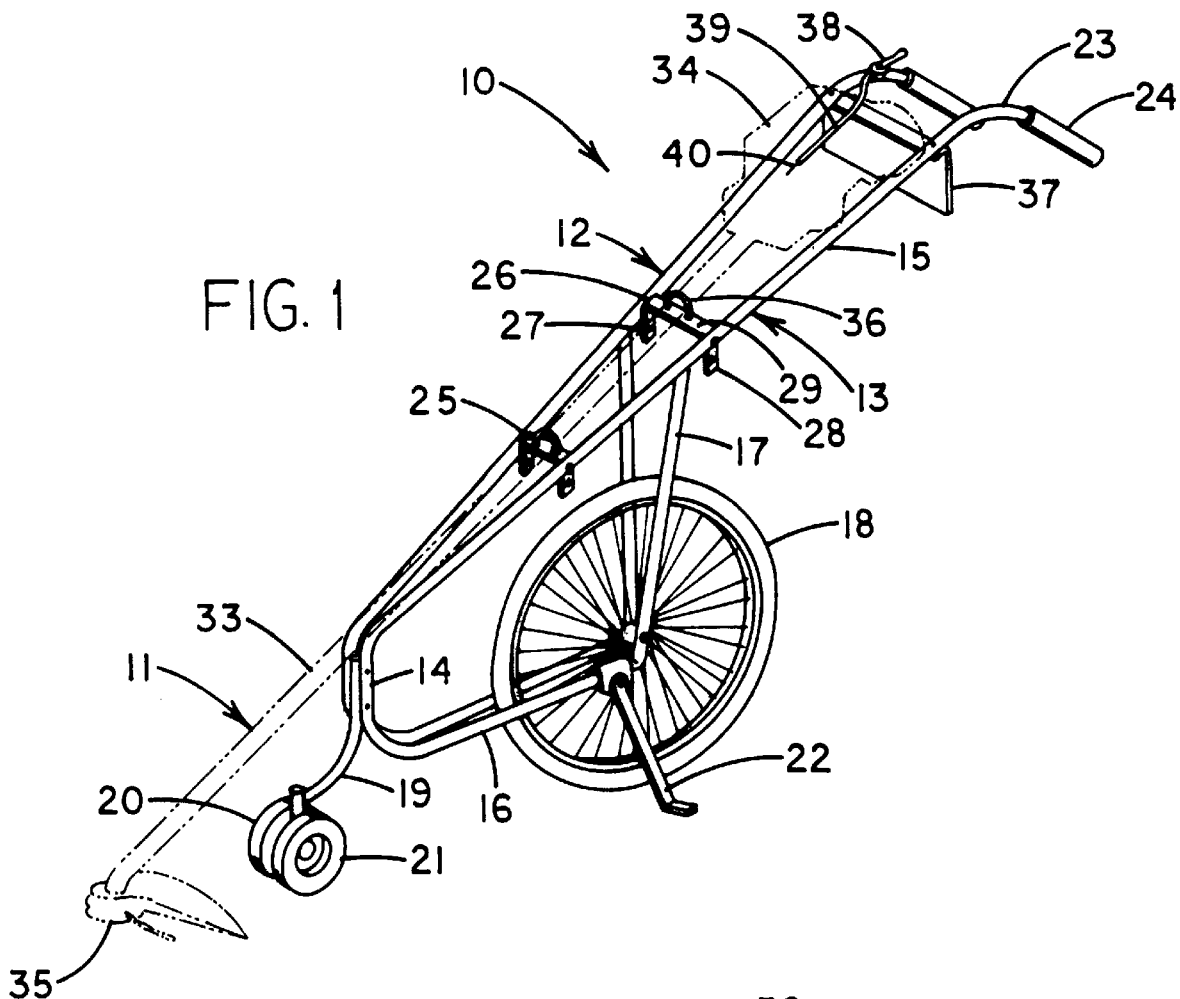
FIG. 1 is a schematic perspective view of a new wheeled carriage assembly according to the present invention.

With reference now to the drawings, and in particular to FIGS. 1 through 4 thereof, a new wheeled carriage assembly embodying the principles and concepts of the present invention and generally designated by the reference numeral 10 will be described.

As best illustrated in FIGS. 1 through 4, the wheeled carriage assembly 10 generally comprises a pair of frames each having elongate front, top, and bottom portions. The top and bottom portions of each frame are spaced apart from one another with the front portion of each frame connecting associated top and bottom portions of the respective frame. The front portions of the frames are coupled together. The frames each have an elongate rear fork extending between the associated top and bottom portions of the respective frame. A ground engaging rear wheel is positioned between the bottom portions of the frame and is rotatably mounted to the rear forks of the frames. A generally J-shaped front fork is coupled to the frames between the front portions of the frames. A pair of adjacent ground engaging front wheels are pivotally mounted to the front fork. The frames each has a handle portion adjacent the associated top portion of the respective frame. A pair of generally rectangular U-shaped mounting brackets are coupled to the top portions of the frames.

In use, the carriage assembly is designed for supporting a grass trimmer 11 so that the grass trimmer is supported above the ground and may be moved over the ground with the carriage assembly. In closer detail, the carriage assembly comprises a pair of generally U-shaped frames 12,13 each comprising elongate front, top, and bottom portions 14,15, 16. The top and bottom portions of each frame are spaced apart from one another with the front portion of each frame connecting associated top and bottom portions of the respective frame so that the associated top and bottom portions of the respective frame rearwardly extend from the front portion of the respective frame. Preferably, the bottom portion of each frame is extended generally perpendicular to the associated front portion of the respective frame. In this preferred embodiment, the top portion of each frame is extended at an obtuse angle to the associated front portion of the respective frame and at an acute angle to the associated bottom portion of the respective frame.

The front portions of the frames are coupled together. The top portions of the frames converge towards each other in a direction towards the front portions of the frames so that the top portions of the frames are extended at an acute angle from one another. The bottom portions of the frames converge towards each other in a direction towards the front portions of the frames so that the bottom portions of the frames are also extended at an acute angle from one another.

The top and bottom portions of the frames each have a back end opposite the front portions of the frames. The back ends of the top portions of the frames are spaced apart from one another and the back ends of the bottom portions of the frames are spaced apart from one another. The frames each have an elongate rear fork 17 extending between the associated top and bottom portions of the respective frame. The rear forks of the frames each have a lower end coupled to the rear end of the associated bottom portion of the respective frame and an upper end coupled to the associated top portion of the respective frame at a point between the associated front portion and the back end of the associated top portion of the respective frame. Preferably, the rear forks of each frame are extended at an obtuse angle to the associated bottom portion of the respective frame. A ground engaging spoked rear wheel 18 is positioned between the bottom portions of the frame and is rotatably mounted to the rear forks of the frames adjacent the lower ends of the rear forks to permit free rotation of the rear wheel about a horizontal axis.

A generally J-shaped front fork 19 is coupled to the frames between the front portions of the frames. The front fork has an arcuate lower portion forwardly extending from the front portions of the frames and which terminates at a front end. A pair of adjacent ground engaging front wheels 20,21 are pivotally mounted to the front end of the lower portion of the front fork to permit swiveling of the front wheels about a generally vertical axis. Preferably, the front wheels have a locking device for releasably holding the front wheels against rotation when a user engages the locking device to the front wheels. In the preferred embodiment, the front wheels have equal outer diameters and the outer diameter of the rear wheel is at least three times greater than the outer diameter of each of the front wheels. In an ideal illustrative embodiment, the outer diameter of the rear wheel is about 20 inches and the outer diameters of the front wheels are each about 5 inches.

Preferably, one of the frames has a kick-stand 22 pivotally coupled to the rear fork of the respective frame. In use, the kick-stand is pivotable to a position when the kick-stand engaged the ground to help hold the carriage assembly upright.

The frames each has a handle portion 23 adjacent the back end of the associated top portion of the respective frame. The handle portions of the frames each are preferably downwardly extended from the associated top portion at an obtuse angle greater than the obtuse angle between the associated front and top portions of the respective frame. Each of the handle portions ideally has a resiliently deformable handgrip 24 thereon for aiding the comfort of a user grasping the handles.

A pair of generally rectangular U-shaped mounting brackets 25,26 are provided each having a spaced apart pair of substantially parallel side braces 27,28 and a top brace 29 connecting the side braces of the respective mounting bracket together. A first of the side braces of each mounting bracket is coupled to the top portion of one of the frames and a second of the side braces of each mounting bracket is coupled to the top portion of the other of the frames. A first of the mounting brackets is positioned towards the front portions of the frame and a second of the mounting brackets is positioned between the first mounting bracket and the back ends of the top portions of the frames. Preferably, the mounting brackets are adjustably attached to the frames to permit raising and lowering of the mounting brackets with respect to the top portions of the frames. The top portion each frame has a spaced apart pair of holes therethrough. In a preferred tubular embodiment of the frames illustrated in FIG. 2, the top portions each have first and second pairs of coaxial holes. The side braces of the mounting brackets each have a plurality of mounting holes 30 therethrough. Each mounting hole of one of the side braces of each respective mounting bracket is paired with an associated mounting hole of the other of the side bracket of the respective mounting bracket. Each pair of mounting holes is generally coaxial with one another. Each of the mounting brackets has a pair of fasteners 31,32. One of the fasteners of each mounting bracket is extended through an associated hole of one of the frames and through a mounting hole of one of the side braces of the respective mounting bracket. The other of the fasteners of each mounting bracket is extended through an associated hole of the other of the frames and through a mounting hole of the other of the side braces of the respective mounting bracket.

Figure 2:
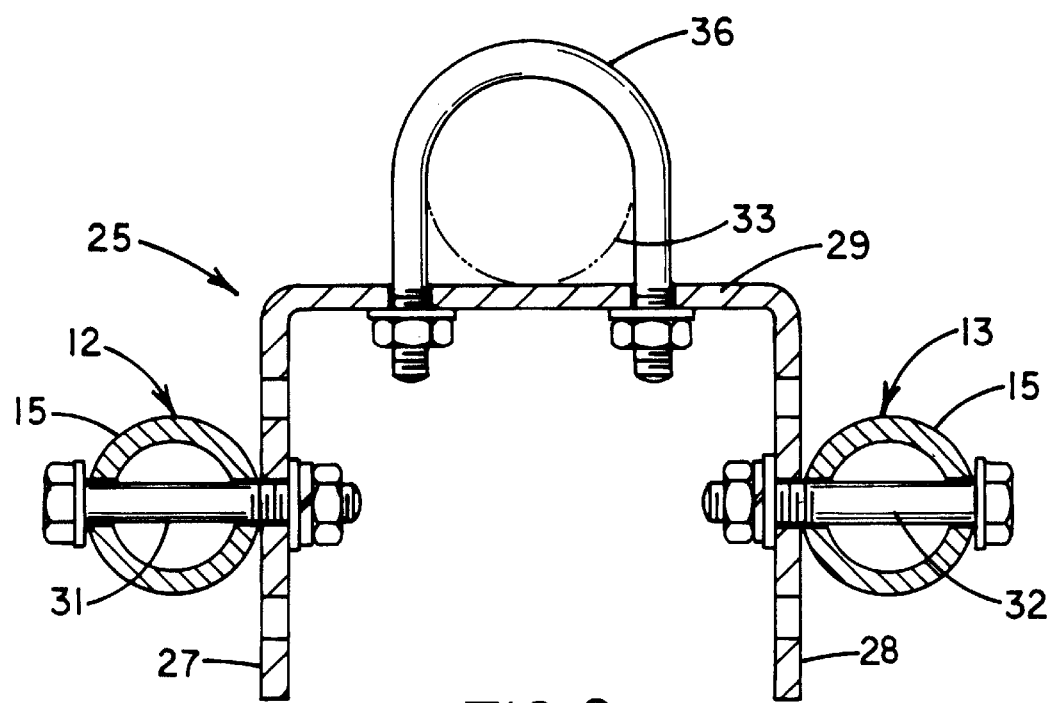
FIG. 2 is a schematic cross sectional view of a mounting bracket of the present invention.
Figure 3:
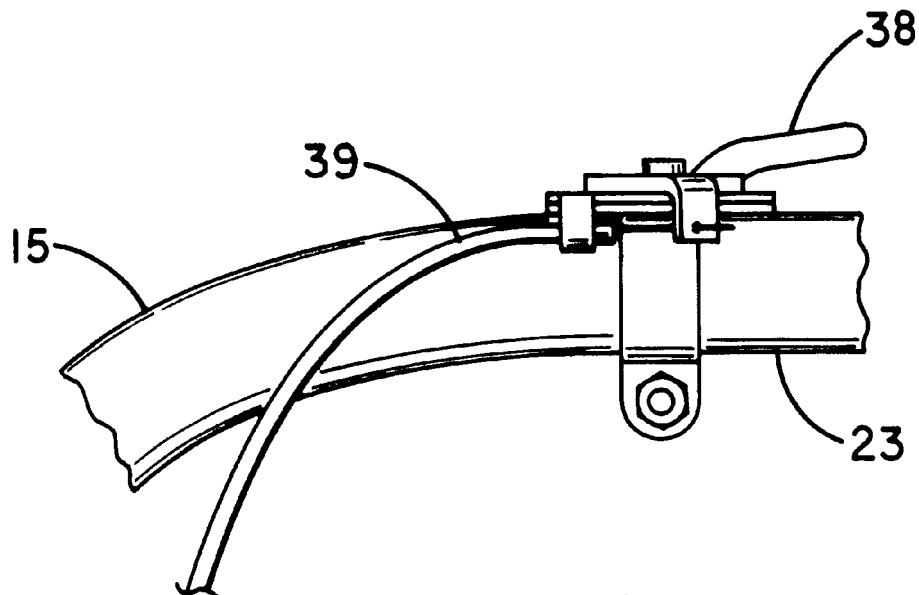
FIG. 3 is a schematic enlarged side view of the throttle lever of the present invention.
Figure 4:
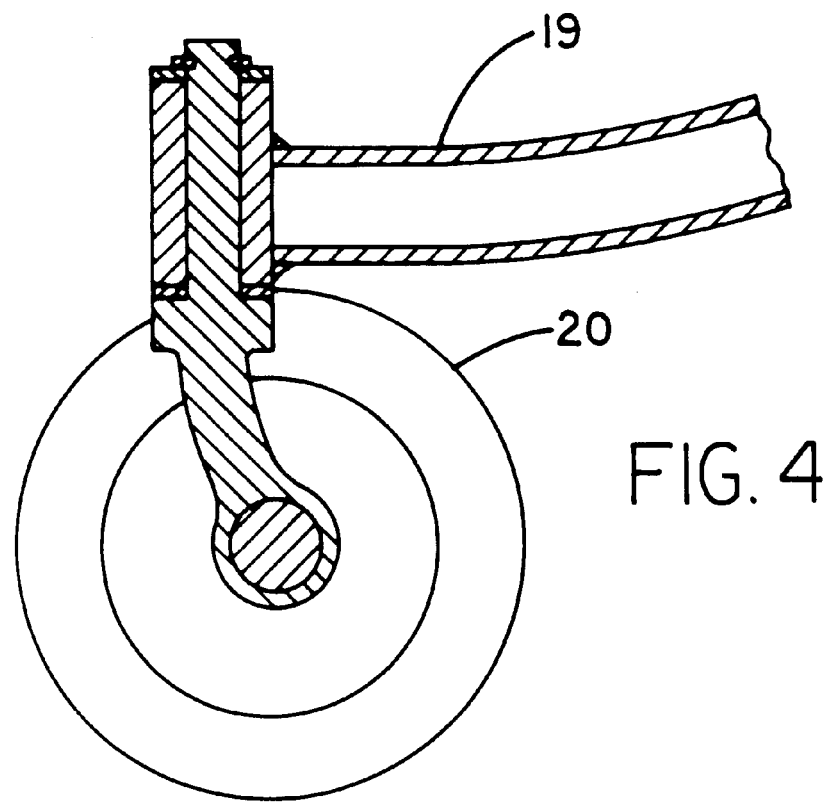
FIG. 4 is a schematic cross sectional view of the front wheels and front fork of the present invention.

In use, the top braces of the mounting brackets are designed for resting an elongate shaft 33 of a grass trimmer thereon such that a motor 34 of the grass trimmer is positioned towards the back ends of the top portions of the frame and a rotating cutting head 35 of the grass trimmer forwardly extends from the front portions of the frames. The top brace of each mounting bracket has an upwardly extending inverted U-shaped attachment bolt 36 detachably coupled thereto. In use, the attachment bolts are designed for extending the elongate shaft of the grass trimmer therethrough so that the attachment bolts hold the elongate shaft of the grass trimmer to the mounting brackets as best illustrated in FIG. 2.

Preferably, a generally rectangular exhaust shield 37 is coupled to top portions of the frames adjacent the handle portions of the frames so that the exhaust shield downwardly depends from the top portions of the frame. In use, the exhaust shield is designed for positioning adjacent an exhaust outlet of the grass trimmer to block exhaust from the grass trimmer from blowing into a user grasping the handles.

Also included in the preferred embodiment is a throttle lever 38 is pivotally coupled to one of the frames adjacent the handle of the respective frame. The throttle lever has a flexible cable 39 extending therefrom which terminates at a free end 40 opposite the throttle lever. In use, the free end of the cable is designed for attachment to a trigger throttle of the grass trimmer to permit actuating of the trigger throttle by pulling on the cable by the pivoting of the throttle lever.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A carriage assembly for supporting a grass trimmer, said carriage assembly comprising:

a pair of frames each comprising elongate front, top, and bottom portions;

said top and bottom portions of each frame being spaced apart from one another, said front portion of each frame connecting associated top and bottom portions of the respective frame;

said front portions of said frames being coupled together;

said frames each having an elongate rear fork extending between the associated top and bottom portions of the respective frame;

a ground engaging rear wheel being positioned between said bottom portions of said frame and being rotatably mounted to said rear forks of said frames;

a generally J-shaped front fork being coupled to said frames between said front portions of said frames;

a pair of adjacent ground engaging front wheels being pivotally mounted to said front fork;

said frames each having a handle portion adjacent the associated top portion of the respective frame;

a pair of generally rectangular U-shaped mounting brackets each having a spaced apart pair of substantially parallel side braces and a top brace connecting said side braces of the respective mounting bracket together;

a first of said side braces of each mounting bracket being coupled to said top portion of one of said frames, a second of said side braces of each mounting bracket being coupled to said top portion of the other of said frames; and said first mounting bracket being positioned towards said front portions of said frame, said second mounting bracket being positioned between said first mounting bracket and said handle portions of said frames.

2. The carriage assembly of claim 1, wherein said bottom portion of each frame is extended generally perpendicular to the associated front portion of the respective frame.

3. The carriage assembly of claim 1, wherein said top portion of each frame is extended at an obtuse angle to the associated front portion of the respective frame.

4. The carriage assembly of claim 1, wherein said top portions of said frames converge towards each other in a direction towards said front portions of said frames, said top portions of said frames being extended at an acute angle from one another, and wherein said bottom portions of said frames converge towards each other in a direction towards said front portions of said frames, said bottom portions of said frames being extended at an acute angle from one another.

5. The carriage assembly of claim 1, wherein said rear fork of each frame is extended at an obtuse angle to the associated bottom portion of the respective frame.

6. The carriage assembly of claim 1, wherein said top brace of each mounting bracket having an upwardly extending inverted U-shaped attachment bolt detachably coupled thereto.

7. The carriage assembly of claim 1, further comprising a generally rectangular exhaust shield being coupled to top portions of said frames adjacent said handle portions of said frames, said exhaust shield being downwardly depended from said top portions of said frame.

8. The carriage assembly of claim 1, further comprising a throttle lever being pivotally coupled to one of said frames adjacent the handle of the respective frame, said throttle lever having a flexible cable extending therefrom, said cable terminating at a free end opposite said throttle lever, said free end of said cable being adapted for attachment to a trigger throttle of a grass trimmer to permit actuating of the trigger throttle by pulling on the cable by the pivoting of the throttle lever.

9. A carriage assembly for supporting a grass trimmer, said carriage assembly comprising:

a pair of frames each comprising elongate front, top, and bottom portions;

said top and bottom portions of each frame being spaced apart from one another, said front portion of each frame connecting associated top and bottom portions of the respective frame;

said bottom portion of each frame being extended generally perpendicular to the associated front portion of the respective frame;

said top portion of each frame being extended at an obtuse angle to the associated front portion of the respective frame and at an acute angle to the associated bottom portion of the respective frame;

said front portions of said frames being coupled together;

said top portions of said frames converging towards each other in a direction towards said front portions of said frames, said top portions of said frames being extended at an acute angle from one another;

said bottom portions of said frames converging towards each other in a direction towards said front portions of said frames, said bottom portions of said frames being extended at an acute angle from one another;

said top and bottom portions of said frames each having a back end opposite said front portions of said frames;

said back ends of said top portions of said frames being spaced apart from one another, said back ends of said bottom portions of said frames being spaced apart from one another;

said frames each having an elongate rear fork extending between the associated top and bottom portions of the respective frame;

said rear forks of said frames each having a lower end coupled to said rear end of the associated bottom portion of the respective frame;

said rear forks of said frames each having an upper end coupled to the associated top portion of the respective frame at a point between the associated front portion and said back end of the associated top portion of the respective frame;

said rear forks of each frame being extended at an obtuse angle to the associated bottom portion of the respective frame;

a ground engaging spoked rear wheel being positioned between said bottom portions of said frame and being rotatably mounted to said rear forks of said frames adjacent said lower ends of said rear forks to permit free rotation of said rear wheel;

a generally J-shaped front fork being coupled to said frames between said front portions of said frames;

said front fork having an arcuate lower portion forwardly extending from said front portions of said frames, said lower portion of said front fork having a front end;

a pair of adjacent ground engaging front wheels being pivotally mounted to said front end of said lower portion of said front fork;

said front and rear wheels each having an outer diameter, said front wheels having equal outer diameters, said outer diameter of said rear wheel being at least three times greater than said outer diameter of each of said front wheels;

one of said frames having a kick-stand pivotally coupled to the rear fork of the respective frame;

said frames each having a handle portion adjacent said back end of the associated top portion of the respective frame;

said handle portions of said frames each being downwardly extended from the associated top portion at an obtuse angle greater than the obtuse angle between the associated front and top portions of the respective frame;

each of said handle portions having a resiliently deformable handgrip thereon;

a pair of generally rectangular U-shaped mounting brackets each having a spaced apart pair of substantially parallel side braces and a top brace connecting said side braces of the respective mounting bracket together;

a first of said side braces of each mounting bracket being coupled to said top portion of one of said frames, a second of said side braces of each mounting bracket being coupled to said top portion of the other of said frames;

said first mounting bracket being positioned towards said front portions of said frame, said second mounting bracket being positioned between said first mounting bracket and said back ends of said top portions of said frames;

said top portion each frame having a spaced apart pair of holes therethrough;

said side braces of said mounting brackets each having a plurality of mounting holes therethrough;

each of said mounting brackets having a pair of fasteners, one of said fasteners of each mounting bracket being extended through an associated hole of one of said frames and through a mounting hole of one of said side braces of the respective mounting bracket, the other of said fasteners of each mounting bracket being extended through an associated hole of the other of said frames and through a mounting hole of the other of said side braces of the respective mounting bracket;

said top braces of said mounting brackets being adapted for resting an elongate shaft of a grass trimmer thereon such that a motor of the grass trimmer is positioned towards said back ends of said top portions of said frame and a rotating cutting head of the grass trimmer forwardly extends from said front portions of said frames;

said top brace of each mounting bracket having an upwardly extending inverted U-shaped attachment bolt detachably coupled thereto;

said attachment bolts being adapted for extending the elongate shaft of the grass trimmer therethrough so that said attachment bolts hold the elongate shaft of the grass trimmer to the mounting brackets;

a generally rectangular exhaust shield being coupled to top portions of said frames adjacent said handle portions of said frames, said exhaust shield being downwardly depended from said top portions of said frame;

said exhaust shield being adapted for positioning adjacent an exhaust outlet of the grass trimmer to block exhaust from the grass trimmer;

a throttle lever being pivotally coupled to one of said frames adjacent the handle of the respective frame; and said throttle lever having a flexible cable extending therefrom, said cable terminating at a free end opposite said throttle lever, said free end of said cable being adapted for attachment to a trigger throttle of the grass trimmer to permit actuating of the trigger throttle by pulling on the cable by the pivoting of the throttle lever.

* * * * *